Jan. 17, 1950 — J. H. LINK — 2,494,768
SHOCK ABSORBER
Filed Nov. 8, 1945
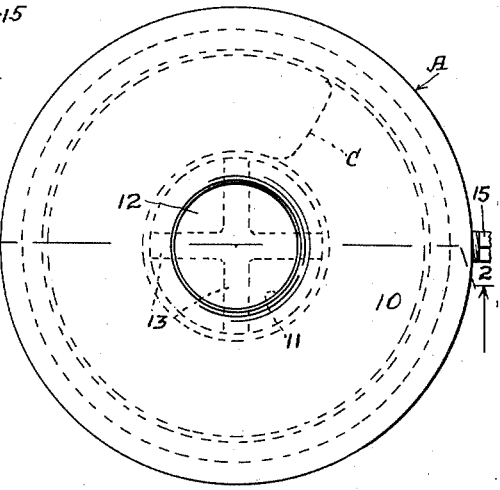
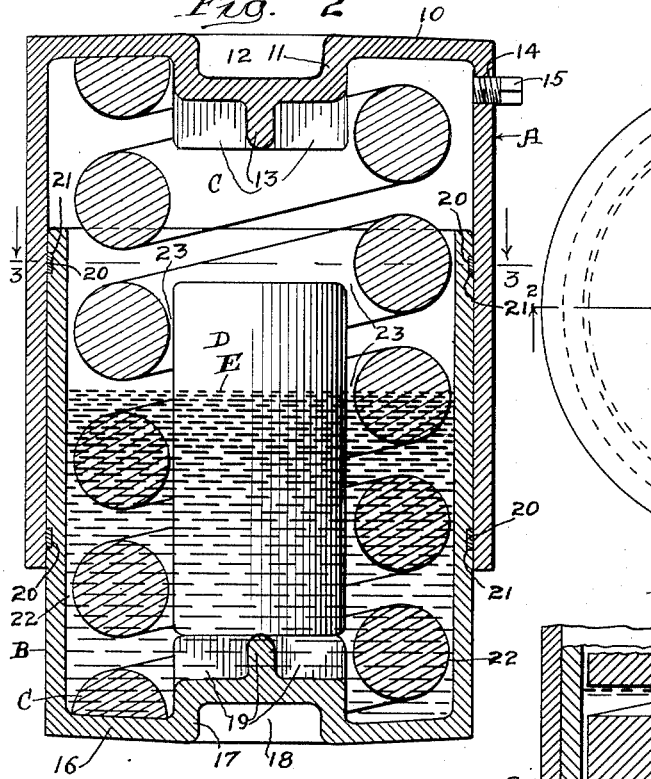
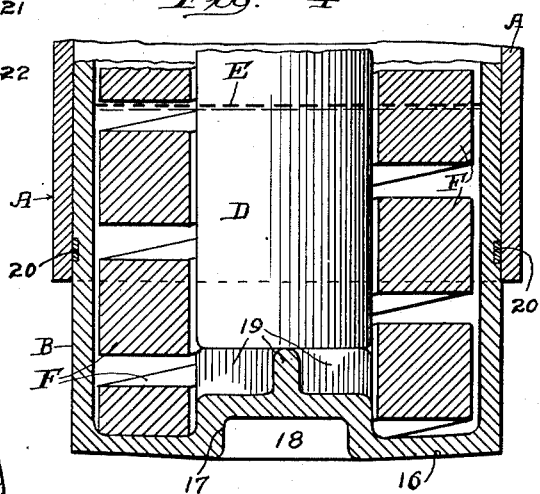
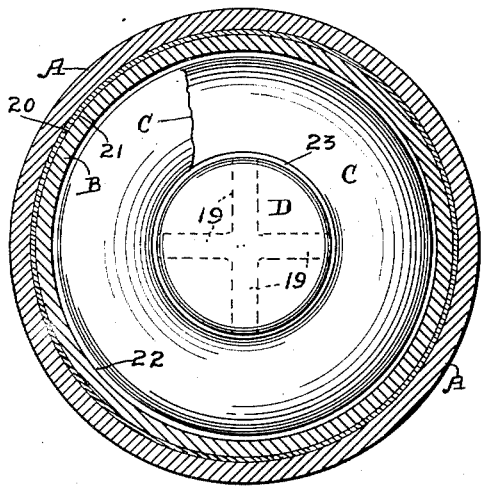
Inventor:
John H. Link.
By Henry Fuchs.
Atty.

Patented Jan. 17, 1950

2,494,768

UNITED STATES PATENT OFFICE 2,494,768

SHOCK ABSORBER

John H. Link, Merion Station, Pa., assignor to W. H. Miner, Inc., Chicago, Ill., a corporation of Delaware Application November 8, 1945, Serial No. 627,330

8 Claims. (Cl. 267—8)

1

This invention relates to improvements in shock absorbers, and more particularly shock absorbers for snubbing the action of truck springs of railway cars.

One object of the invention is to provide a shock absorber of the hydraulic type for efficiently snubbing the action of truck springs of railway cars, comprising a spring resistance and having fluid means for retarding the action of the spring resistance in both compression and recoil, wherein the action of the fluid means is under automatic control.

A more specific object of the invention is to provide a shock absorber of the character indicated, comprising a pair of casings which are slidingly telescoped; a helical spring within the casings opposing relative movement thereof toward each other; a movable plunger acting as valve means; and fluid means within the casings, wherein the compression and expansion of the spring means effects displacement of the fluid, and the spring means and the plunger are arranged to provide restricting passages for the flow of the fluid, thereby retarding the displacement of the same and effectively retarding the action of the spring in both compression and recoil.

A still further object of the invention is to provide a shock absorber, as specified in the preceding paragraph, wherein the plunger is movable lengthwise within the spring, acting in the manner of a piston, displaceable by the fluid to automatically control the flow thereof and thereby govern the spring retarding action of the device.

Other objects of the invention will more clearly appear from the description and claims hereinafter following.

In the drawing forming a part of this specification, Figure 1 is a top plan view of my improved shock absorber. Figure 2 is a transverse, vertical sectional view, corresponding substantially to the line 2—2 of Figure 1. Figure 3 is a horizontal sectional view, corresponding substantially to the line 3—3 of Figure 1. Figure 4 is a view, similar to Figure 1, partly broken away, of the lower end section of the device, illustrating another embodiment of the invention.

Referring first to the embodiment of the invention illustrated in Figures 1, 2, and 3, my improved shock absorber comprises broadly an upper casing A; a lower casing B telescoped within the upper casing; a spring C; a displaceable plug or plunger D; and a fluid element E.

The casing A is in the form of a tubular cylin-

2 drical shell open at its lower end and closed at its upper end by a transverse, horizontal wall 10. Interiorly the casing A is provided with a central, depending, hollow boss 11 on the wall 10. The hollow boss 11 provides a seat 12 for the usual centering projection on the upper spring follower plate of a spring cluster of a railway car truck. On its lower side, the boss 11 is provided with transversely extending, intersecting ribs 13—13. The ribs 13—13 intersect at right angles and form a cross-shaped abutment for the upper end of the plunger D. Near the upper end of the casing A, the cylindrical side wall of the same is provided with a filler opening 14 for the fluid, which opening is closed by a pipe plug 15.

The casing B is also in the form of a tubular, cylindrical shell and is open at its upper end and closed at its lower end by a horizontal, transverse wall 16, provided with a centering boss 17 presenting a seat 18 for the usual spring centering projection of the lower spring follower plate of a truck spring cluster. The boss 17 is in all respects similar to the boss 11 hereinbefore referred to and has transversely extending, upstanding, intersecting ribs 19—19 similar to the ribs 13—13 and forming a support for the plunger D.

The casing B is slidingly telescoped within the casing A and is preferably provided with a pair of sealing rings 20—20 seated in annular grooves 21—21 and bearing on the interior surface of the cylindrical side wall of the casing A.

The spring C, which is in the form of a helical coil made from a bar of circular cross section, is arranged vertically within the telescoped casings A and B and bears at its top and bottom ends respectively on the end walls of the top and bottom casings. As shown in Figure 1, the bosses 11 and 17 extend into opposite ends of the spring, and the spring is of such an outside diameter as to fit loosely within the casing B, that is, so as to leave restricted passages between the cylindrical side wall of the casing and the outer sides of the coils of the spring, as indicated at 22—22.

The plunger or plug D is in the form of a solid cylinder and normally rests on the support formed by the cross-shaped ribs of the boss 17 of the casing B. The plunger D is of a diameter to loosely fit within the coils of the spring C, that is, so as to leave restricted passages 23—23 between the inner sides of the coils of the spring and the cylindrical outer surface of the plunger. As shown in Figure 2, the plunger D is of such a height that in its normal position, resting on the support formed by the ribs 19—19 of the boss 17, the upper end thereof is spaced from the abutment formed by the ribs 13—13 of the boss of the upper casing A, thus providing for limited upward displacement of the plunger.

The fluid element E employed in my improved shock absorber is preferably oil, but any other suitable liquid may be used. The fluid E is contained within the casing B and surrounds the spring C and the plunger or plug D, the casing being filled to a level somewhat below the top of the plunger D, as shown in Figure 2.

The operation of my improved shock absorber is as follows: Upon compression of the same between two relatively movable members, such as the spring follower plates of a truck spring cluster of a railway car, the casing A is moved downwardly toward the casing B, compressing the spring C. As the spring C is compressed, the coils thereof are closed up, displacing a portion of the fluid E, the displaced fluid being forced through the restricted passages 22 and 23 between the spring C, the wall of the casing B, and the spring C and the plunger D, retarding the action of the spring C and snubbing the truck springs. This retarding fluid action is controlled by the plunger D, which is displaceable upwardly within the spring C in the manner of a piston, when relatively heavy shocks are encountered which effect more rapid compression of the spring C. Under such conditions, the plunger is forced upwardly by the pressure of the fluid E exerted on the bottom end of the plunger, which bottom end is exposed to the action of the fluid through the openings provided between the ribs 19—19 of the boss 17, thus easing the resistance offered to the flow of the fluid by the restricting passages 22 and 23.

The recoil action of the spring C restores all of the parts to the normal full release position shown in Figure 2 and, as will be evident, this recoil action is also retarded by the flow of the fluid through the restricted passages 22 and 23. The suction created by the fluid being drawn through the passages 22 and 23 and the weight of the plunger D effect return of the plunger to its normal seated position, engagement of the plunger with the stop formed by the boss 11 of the upper casing A in no way interfering with its return, as the upper end of the plunger is held free of direct contact with the boss by the spacing ribs 13—13.

Referring next to the embodiment of the invention illustrated in Figure 4, the construction and design is in all respects similar to that illustrated in Figures 1, 2, and 3, with the exception that the coil spring, which is indicated by F in Figure 4, is coiled from a bar of square cross section.

I claim:

1. In a shock absorber, the combination with a tubular casing open at one end and closed at the other end; of a second tubular casing open at one end and closed at the other end, said second named casing being telescoped within the open end of the first named casing, said casings being relatively movable lengthwise toward and away from each other; a fluid within said second named casing; a coil spring within said casings yieldingly opposing relative approach thereof, said spring loosely fitting said second named casing to provide restricting passages for said fluid between the outer side of the spring and the side wall of said second named casing; and a plug loosely fitting the interior of the coil spring, said plug being movable lengthwise with respect to both casings.

2. In a shock absorbed, the combination with a tubular casing open at one end and closed at the other end; of a second tubular casing open at one end and closed at the other end and having its open end slidingly telescoped within the open end of the first named casing; a fluid within said second named casing; a central plug within said second named casing, said plug being movable lengthwise with respect to both casings; and a helical coil spring within said casings opposing relative movement thereof toward each other, said spring surrounding said plug and loosely fitting between said plug and the tubular side wall of said second named casing to provide restricting passages for said fluid.

3. In a shock absorber, the combination with a tubular casing open at one end and closed at the other end; of a second tubular casing open at one end and closed at the other end, said second named casing being telescoped within the open end of the first named casing, said casings being relatively movable lengthwise toward and away from each other; a fluid within said second named casing; a coil spring within said casings yieldingly opposing relative approach thereof, said spring loosely fitting said second named casing to provide restricting passages for said fluid between the outer side of the spring and the side wall of said second named casing; and a plunger movable lengthwise with respect to both casings and loosely fitting the interior of the coil spring, said plunger having one end thereof exposed to the pressure of the fluid.

4. In a shock absorber, the combination with a tubular casing open at one end and closed at the other end; of a second tubular casing open at one end and closed at the other end and having its open end slidingly telescoped within the open end of the first named casing; a central plunger within said second named casing, said plunger being movable lengthwise with respect to both casings and having one end exposed to the pressure of said fluid; and a helical coil spring within said casings opposing relative movement thereof toward each other, said spring surrounding said plunger and loosely fitting between said plunger and the tubular side wall of said second named casing to provide restricting passages for said fluid.

5. In a shock absorber, the combination with an upper tubular casing open at its lower end and closed at its upper end; of a lower tubular casing slidingly telescoped within said upper casing, said lower casing being open at its upper end and closed at its lower end; a fluid within said lower casing; a coil spring within said casings yieldingly opposing relative approach thereof, said spring loosely fitting said lower casing to provide restricting passages for said fluid between the outer side of the spring and the side wall of the casing; and a plunger movable lengthwise with respect to said lower casing, said plunger being normally supported at its lower end by said lower casing, loosely fitting the interior of the coil spring.

6. In a shock absorber, the combination with an upper tubular casing open at its lower end and closed at its upper end; of a lower tubular casing slidingly telescoped within said upper casing, said lower casing being open at its upper end and closed at its lower end; a fluid within said lower casing; a central plunger supported at its lower end within said lower casing said plunger being movable lengthwise of said lower casing; and a helical coil spring within said casings opposing relative movement thereof toward each other, said spring surrounding said plunger and loosely fitting between said plunger and the tubular side wall of said lower casing to provide restricting passages for said fluid.

7. In a shock absorber, the combination with an upper tubular casing open at its lower end and closed at its upper end; of a lower tubular casing slidingly telescoped within said upper casing, said lower casing being open at its upper end and closed at its lower end; a fluid within said lower casing; a coil spring within said casings yieldingly opposing relative approach thereof, said spring loosely fitting said lower casing to provide restricting passages for said fluid between the outer side of the spring and the side wall of the casing; and a plunger movable lengthwise with respect to both casings, said plunger being normally supported at its lower end by said lower casing and loosely fitting the interior of the coil spring, the lower end of said plunger being exposed to the pressure of said fluid.

8. In a shock absorber, the combination with an upper tubular casing open at its lower end and closed at its upper end; of a lower tubular casing slidingly telescoped within said upper casing, said lower casing being open at its upper end and closed at its lower end; a fluid within said lower casing; a central plunger movable vertically with respect to both casings, said plunger being normally supported at its lower end within said lower casing, said plunger having its lower end exposed to the pressure of the fluid; and a helical coil spring within said casings opposing relative movement thereof toward each other, said spring surrounding said plunger and loosely fitting between said plunger and the tubular side wall of said lower casing to provide restricting passages for said fluid.

JOHN H. LINK.

REFERENCES CITED

The following references are of record in the file of this patent:

UNITED STATES PATENTS

| Number | Name | Date |
|---|---|---|
| 1,876,145 | McGrew | Sept. 6, 1932 |
| 2,099,240 | Sproul | Nov. 16, 1937 |
| 2,171,185 | Maier | Aug. 29, 1939 |

FOREIGN PATENTS

| Number | Country | Date |
|---|---|---|
| 392,514 | Germany | Mar. 24, 1924 |